(12) United States Patent
Hasegawa et al.

(10) Patent No.: US 7,714,751 B2
(45) Date of Patent: May 11, 2010

(54) TRANSCODER CONTROLLING GENERATED CODES OF AN OUTPUT STREAM TO A TARGET BIT RATE

(75) Inventors: Hiromu Hasegawa, Osaka (JP); Miyuki Yanagida, Tokyo (JP)

(73) Assignees: MegaChips Corporation, Osaka-shi (JP); NTT Electronics Corporation, Tokyo (JP)

( * ) Notice: Subject to any disclaimer, the term of this patent is extended or adjusted under 35 U.S.C. 154(b) by 0 days.

(21) Appl. No.: 12/144,098

(22) Filed: Jun. 23, 2008

(65) Prior Publication Data

US 2009/0009370 A1 Jan. 8, 2009

(30) Foreign Application Priority Data

Jul. 5, 2007 (JP) .............................. 2007-177738

(51) Int. Cl.
*H03M 7/00* (2006.01)
(52) U.S. Cl. ..................... 341/61; 375/240.04
(58) Field of Classification Search ............. 341/50–80; 375/240.04, 240.07
See application file for complete search history.

(56) References Cited

U.S. PATENT DOCUMENTS

| | | | |
|---|---|---|---|
| 6,055,330 A * | 4/2000 | Eleftheriadis et al. ....... | 382/154 |
| 6,466,624 B1 * | 10/2002 | Fogg ..................... | 375/240.27 |
| 6,587,508 B1 * | 7/2003 | Hanamura et al. ..... | 375/240.24 |
| 6,825,886 B2 * | 11/2004 | Kobayashi et al. ....... | 348/405.1 |
| 7,266,148 B2 * | 9/2007 | Kim ...................... | 375/240.03 |
| 7,397,855 B2 | 7/2008 | Chen | |

FOREIGN PATENT DOCUMENTS

JP 2006-74635 3/2006

OTHER PUBLICATIONS

U.S. Appl. No. 12/360,350, filed Jan. 27, 2009, Hasegawa, et al.
U.S. Appl. No. 12/367,765, filed Feb. 9, 2009, Hasegawa, et al.

* cited by examiner

*Primary Examiner*—Lam T Mai
(74) *Attorney, Agent, or Firm*—Oblon, Spivak, McClelland, Maier & Neustadt, L.L.P.

(57) ABSTRACT

A transcoder calculates a reference conversion factor on the basis of a ratio between a total target bit rate of a whole second stream and an total input bit rate of a whole first stream and calculates a coefficient of variation from the total target bit rate of the whole second stream and an average output bit rate of a converted second stream in the N period. Next, a quantization step conversion factor in the next (N+1) period is calculated by adding the coefficient of variation to the reference conversion factor. Then, a quantization step value of a second stream in the (N+1) period is calculated by multiplying a quantization step value of a first stream in the (N+1) period by the quantization step conversion factor.

68 Claims, 4 Drawing Sheets

TRANSCODER CONTROLLING GENERATED CODES OF AN OUTPUT STREAM TO A TARGET BIT RATE

BACKGROUND OF THE INVENTION

1. Field of the Invention

The present invention relates to a transcoder for converting an input stream into a different output stream, and more particularly to a technique to appropriately control the amount of generated codes of the output stream toward a target bit rate.

2. Description of the Background Art

Images to be delivered on digital broadcasts, those to be stored in media such as DVDs and hard disks, and the like are compressed in accordance with various coding systems. The object for such compressions is to avoid constraint on a transmission band, increase the transmission speed, decrease the memory size or the like.

There are various standards for image coding system, such as MPEG2 and H.264. And there is a case where the coding system is converted for the purpose of reducing the amount of codes in a coded image that is inputted, or the like. A transcoder once decodes the inputted coded image. Then, the transcoder codes the decoded image in a different coding system (or the same coding system) again. Thus, the transcoder controls a bit rate of an output stream.

Japanese Patent Application Laid Open Gazette No. 2006-74635 relates to a transcoder for converting an image compressed in a first compressive coding system into an image compressed in a second compressive coding system. This transcoder uses intermediate information generated during the decoding of the image compressed in the first compressive coding system to compress the image in the second compressive coding system.

In a rate control technique that has been conventionally used, image data of known format (frame rate/image size) is used as an input. Further, parameters for coding such as a target bit rate or GOP picture structure (IBBP . . . ) are intentionally determined by a user, and after determining these parameters, the coding is started.

In other words, before coding of a sequence, these information is given as known parameters, and these parameters are not changed during the coding of the sequence. Therefore, it is possible to intentionally perform a bit assignment for control of rate in advance to some degree.

On the other hand, in a rate control by a transcoder, a target bit rate of a whole output stream is set by a user, and specifications of an input stream, i.e., image size (format), frame rate, GOP picture structure, bit rate and the like, can not be recognized until a certain unit of the input stream (e.g., a sequence header, a picture header or one whole GOP) is decoded. Further, there is sometimes a case where an input stream consists of a plurality of different streams which are edited by cut and paste. In such a case, sometimes, the above specifications of the input stream are changed during the decoding. Though it is possible to solve this problem by recoding the decoded image after acquiring information obtained in the course of decoding of the input stream in advance, there disadvantageously arises a delay in an output by the streams to be taken in advance. For this reason, in a case of transcoding in one pass in real time, a system different from the background-art technique is needed in order to achieve an averaged bit rate of the output stream.

SUMMARY OF THE INVENTION

The present invention is intended for a transcoder for converting a first stream into a second stream. According to the present invention, the transcoder comprises a part for acquiring a bit rate of a whole first stream, a part for setting a target bit rate of a whole second stream, a part for calculating a reference conversion factor on the basis of a ratio between the target bit rate of the whole second stream and the bit rate of the whole first stream, a variation coefficient calculation part for calculating a coefficient of variation from the target bit rate of the whole second stream and a bit rate of a second stream converted before the N period, a part for calculating a period conversion factor in the next (N+1) period by adding the coefficient of variation to the reference conversion factor, and a part for calculating a quantization step value of a second stream in the (N+1) period by multiplying a quantization step value of a first stream in the (N+1) period by the period conversion factor.

Since the coefficient of variation is determined in consideration of the bit rate of the converted second stream, it is possible to appropriately control the second stream toward the target bit rate.

According to another aspect of the present invention, the transcoder comprises a part for setting a target bit rate of a whole second stream, and a target bit rate determining part for determining a target bit rate of a second stream in the (N+1) period on the basis of the target bit rate of the whole second stream, a bit rate of a second stream converted before the N period and a target bit rate of a second stream in the N period.

Since the target setting bit rate is determined by control unit time, it is possible to appropriately control the second stream toward the target bit rate.

According to still another aspect of the present invention, assuming that a target ratio between the bit rate of the second stream converted before the N period and the target bit rate of the second stream in the N period is determined as a target ratio, the target bit rate determining part calculates the target bit rate of the second stream in the (N+1) period on the basis of a ratio between the target bit rate of the whole second stream and the target ratio.

According to yet another aspect of the present invention, assuming that a value calculated on the basis of a difference between the target bit rate of the second stream in the N period and the bit rate of the second stream converted before the N period is determined as a target difference, the target bit rate determining part calculates the target bit rate of the second stream in the (N+1) period by adding the target difference to the target bit rate of the whole second stream.

It is therefore possible to appropriately control the target setting bit rate to follow the target.

Therefore, it is an object of the present invention to appropriately control the mount of generated codes of an output stream toward the target bit rate without any delay in outputting a stream.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
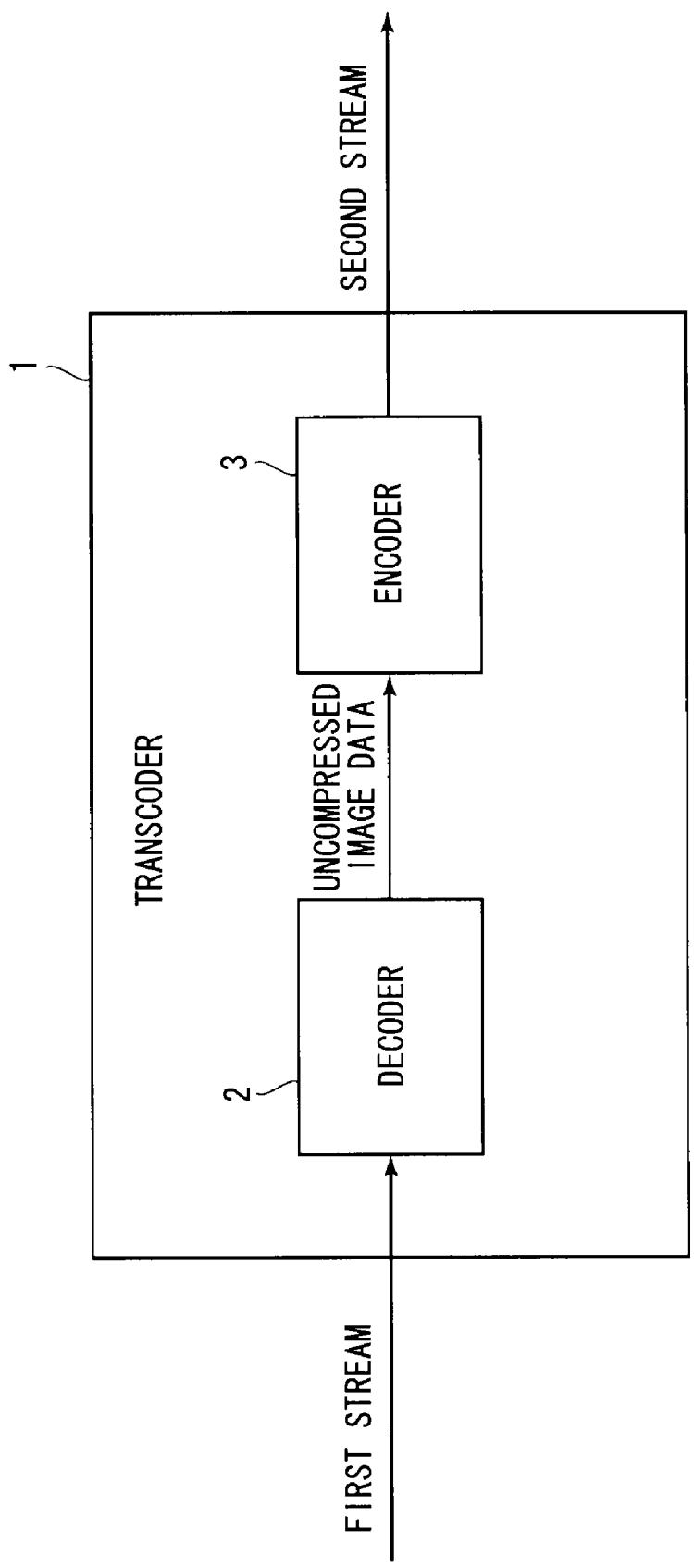
FIG. 1 is a block diagram showing a transcoder.

Hereinafter, the preferred embodiments of the present invention will be discussed, referring to the drawings. FIG. 1 is a block diagram showing a transcoder 1 in accordance with the preferred embodiments. The transcoder 1 comprises a decoder 2 and an encoder 3.

The decoder 2 inputs a first stream. The first stream is a stream of coded image. The decoder 2 decodes the first stream and outputs uncompressed image data to the encoder 3. The encoder 3 recodes the uncompressed image data which is decoded by the decoder 2 and outputs a second stream.

The transcoder 1 converts a coding system of stream, and for example, inputs a first stream coded in MPEG2 and outputs a second stream coded in H.264. The present invention is devised in order to optimally control the rate of the second stream to be outputted in the conversion. Alternatively, the transcoder 1 outputs a stream of the same coding system, and for example, inputs a first stream coded in MPEG2 and outputs a second stream recoded in MPEG2. Also in this case, the present invention is devised in order to optimally control the rate of the second stream to be outputted.

In the first to fifth preferred embodiments discussed later, various computations are performed in the decoder 2 and the encoder 3, and these computations performed in the decoder 2 and the encoder 3 may be implemented by hardware or may be implemented by software operations. In other words, the decoder 2 and the encoder 3 may be constructed as hardware circuits or implemented by a CPU and programs stored in memories. Alternatively, there may be a case where some of the computations are performed by hardware and others are performed by software.

Figure 2:
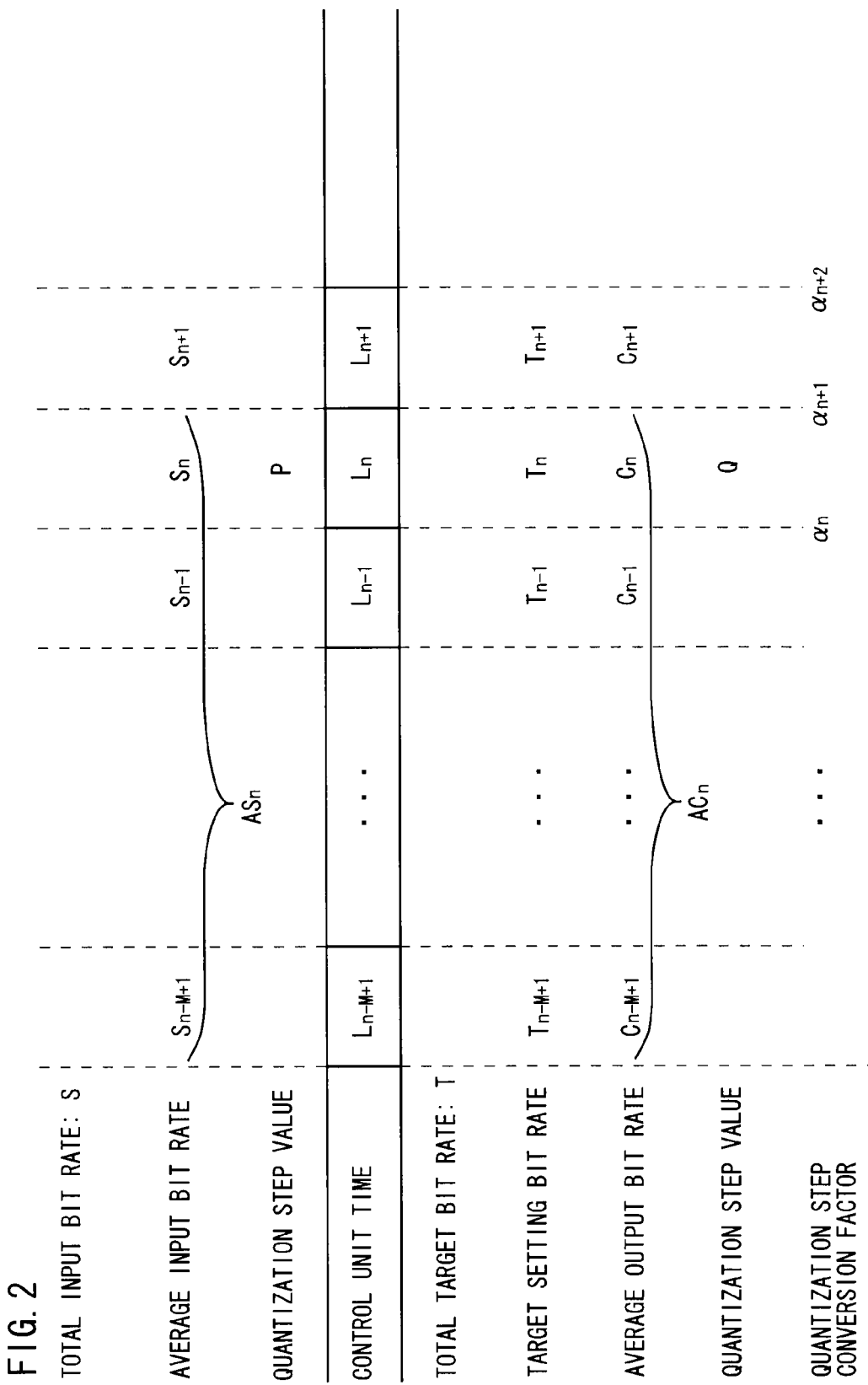
FIG. 2 is a view showing information on an input stream (first stream) and an output stream (second stream) by control unit time.

FIG. 2 is a view showing information on streams that the transcoder 1 inputs or outputs, by control unit time. The transcoder 1 divides the processing time base into control unit times $L_n$ (n=1, 2 ...) and performs a rate control by using this control unit time $L_n$ as a unit of processing. In the following discussion, the control unit time $L_n$ is referred to as "the n-th period" as appropriate. As the control unit time $L_n$, one frame, a plurality of successive frames, one GOP, a plurality of successive GOPs or the like may be set as one unit of period.

A total input bit rate S of the first stream is acquired from a sequence header or the like. An average input bit rate $S_n$ is an average bit rate of the first stream in the n period. The transcoder 1 comprises a buffer and can store information on average input bit rates $S_n$ for M periods. Specifically, the buffer can store information on the average input bit rates $S_n$ from the (n−M+1) period to the n period. An average period bit rate $AS_n$ is an average value of the average input bit rates $S_n$ from the (n−M+1) period to the n period. The average period bit rate $AS_n$ is expressed by Eq. 1.

$$AS_n = \frac{1}{M} \sum_{n-M+1}^{n} S_i \quad \text{(Eq. 1)}$$

The decoder 2 acquires information on the total input bit rate S, the average input bit rate $S_n$, the average period bit rate $AS_n$, the quantization step value P in the n period or the like from the inputted first stream and outputs these information to the encoder 3. The encoder 3 uses these information to recode the image.

A total target bit rate T of the second stream is set by a user. For example, the user uses a not-shown operation part included in the transcoder 1 to set the total target bit rate T. A target setting bit rate $T_n$ is a target bit rate of the second stream in the n period. An average output bit rate $C_n$ is an average bit rate of the second stream converted in the n period. The transcoder 1 comprises a buffer and can store information on the average output bit rates $C_n$ for M periods. Specifically, the buffer can store information on the average output bit rates $C_n$ from the (n−M+1) period to the n period. An average period bit rate $AC_n$ is an average value of the average output bit rates $C_n$ from the (n−M+1) period to the n period. The average period bit rate $AC_n$ is expressed by Eq. 2. Though the buffer period used for calculation of the average period bit rate $AS_n$ or $AC_n$ is linked to the control unit time $L_n$ in these preferred embodiments, setting of the buffer period is not limited to this case. For example, one past frame at the point of time when coding is finished, a plurality of successive past frames, one past GOP, a plurality of successive past GOPS or the like may be set as the buffer period.

$$AC_n = \frac{1}{M} \sum_{n-M+1}^{n} C_i \quad \text{(Eq. 2)}$$

Further, a quantization step conversion factor $\alpha_n$ is a factor calculated at the point of time when the (n−1) period is finished. A quantization step value Q of the second stream is determined by multiplying the quantization step value P of the first stream or a value P calculated from the quantization step value of the first stream by the quantization step conversion factor $\alpha_n$. This relation is expressed by Eq. 3.

$$Q = \alpha_n P \quad \text{(Eq. 3)}$$

The initial value $\alpha_1$ of the quantization step conversion factor $\alpha_n$ is given by Eq. 4. Specifically, a value obtained by dividing the total target bit rate T of the second stream by the total input bit rate S of the first stream, i.e., a bit rate ratio, is substituted into function f, to obtain the initial value $\alpha_1$ of the quantization step conversion factor $\alpha_n$.

$$\alpha_1 = f(T/S) \quad \text{(Eq. 4)}$$

The function f is a function for obtaining a ratio of quantization step values from the ratio of bit rates, and assuming that the ratio of bit rates is $R_B$ and the ratio of quantization step values is $R_Q$, the function f is generally expressed by Eq. 5.

$$R_Q = f(R_B) \quad \text{(Eq. 5)}$$

A specific example of the function f will be discussed. In these preferred embodiments, as shown in Eq. 6, used are functions controlling the ratio of quantization step values with different features of types I, P and B (I picture, P picture and B picture) of picture or macroblock. In Eq. 6, $f_I(x)$, $f_P(x)$ and $f_B(x)$ are functions corresponding to the I picture, the P picture and the B picture, respectively.

$$\begin{cases} f_I(x) = \varepsilon_I * x^{-\delta_I} = 2.1 * x^{-1.1} \\ f_P(x) = \varepsilon_P * x^{-\delta_P} = 2.1 * x^{-0.8} \\ f_B(x) = \varepsilon_B * x^{-\delta_B} = 1.3 * x^{-0.9} \end{cases} \quad \text{(Eq. 6)}$$

In Eq. 6, as values of $\varepsilon_I$, $\varepsilon_P$, $\varepsilon_B$, $\delta_I$, $\delta_P$ and $\delta_B$ in the case of stream conversion from MPEG2 into H.264, specific numerical values calculated on the basis of an experiment or the like are shown. Specifically, as the result of the experiment, when $\varepsilon_I=2.1$, $\varepsilon_P=2.1$, $\varepsilon_B=1.3$, $\delta_I=1.1$, $\delta_P=0.8$ and $\delta_B=0.9$, an excellent feature can be obtained. Other than this, by using the feature value of the image which is acquired in decoding the input stream, the values of $\varepsilon$ and $\delta$ may be determined. As shown in Eq. 7, for example, on the basis of an activity value (act value) and a motion evaluation value (sad value), the values of $\varepsilon$ and $\delta$ may be determined.

$$\begin{cases} f_I(x) = \varepsilon_I(a, s) * x^{-\delta_I(a,s)} \\ f_P(x) = \varepsilon_P(a, s) * x^{-\delta_P(a,s)} \\ f_B(x) = \varepsilon_B(a, s) * x^{-\delta_B(a,s)} \end{cases} \quad \text{(Eq. 7)}$$

In Eq. 7, "a" represents the act value and "s" represents the sad value, and $\varepsilon_I(a, s)$, $\varepsilon_P(a, s)$, $\varepsilon_B(a, s)$, $-\delta_I(a, s)$, $-\delta_P(a, s)$, $-\delta_B(a, s)$ represent the values of $\varepsilon$ and $\delta$ which are calculated by using the act value and the sad value as parameters.

The activity value is obtained by calculating a differential absolute value sum of an average pixel value in a macroblock and a pixel value of each pixel in the macroblock by macroblock. In other words, the activity value is an evaluation value indicating the degree of dispersion of pixels in the macroblock. This is the same as an activity value used in the code amount control model TM5 of MPEG2 or the like. The motion evaluation value (sad value) is obtained by calculating an interframe differential absolute value sum of a pixel value of each pixel in a reference image macroblock and a pixel value of the corresponding pixel in a macroblock, by macroblock. In other words, the motion evaluation value is obtained by comparing each pixel in a macroblock and the corresponding pixel in the reference image macroblock and calculating an absolute value sum of differentials of pixel values of corresponding pixels in the same coordinate positions.

More generally, assuming that an feature value of an image in the n period is determined as $I_{Ln}$, $f_I(x)$, $f_P(x)$ and $f_B(x)$ are expressed by Eq. 8.

$$\begin{cases} f_I(x) = \varepsilon_I(I_{L_n}) * x^{-\delta_I(I_{L_n})} \\ f_P(x) = \varepsilon_P(I_{L_n}) * x^{-\delta_P(I_{L_n})} \\ f_B(x) = \varepsilon_B(I_{L_n}) * x^{-\delta_B(I_{L_n})} \end{cases} \quad \text{(Eq. 8)}$$

In Eq. 8, $\varepsilon_I(I_{Ln})$, $\varepsilon_P(I_{Ln})$, $\varepsilon_B(I_{Ln})$, $-\delta_I(I_{Ln})$, $-\delta_P(I_{Ln})$ and $-\delta B(I_{Ln})$ represent the factors $\varepsilon$ and $\delta$ which are determined by using the feature value $I_{Ln}$ of the image as parameters.

The First Preferred Embodiment

Next, the first preferred embodiment of the present invention will be discussed on a method of calculating the quantization step conversion factor $\alpha_n$ used for calculation of the quantization step value Q of the second stream. The transcoder 1 calculates the quantization step conversion factor $\alpha_{n+1}$ after a lapse of the n period.

Eq. 9 is an equation for calculation of the quantization step conversion factor $\alpha_{n+1}$. In Eq. 9, $(T-C_n)$ is obtained by subtracting the average output bit rate $C_n$ of the converted second stream in the n period from the total target bit rate T of the second stream. This value is referred to as a coefficient of variation. In Eq. 9, "k" represents an adjustment factor used for adjusting the coefficient of variation and is a positive value.

$$\alpha_{n+1}=k*(T-C_n)+\alpha_1 \quad \text{(Eq. 9)}$$

Thus, the ratio of the quantization step values is adjusted toward a target by adding the coefficient of variation to the initial value $\alpha_1$ obtained by Eq. 4. In this meaning, the initial value $\alpha_1$ of the quantization step conversion factor can be referred to as a reference conversion factor.

After obtaining the quantization step conversion factor $\alpha_{n+1}$ by using Eq. 9, the quantization step value Q of the second stream in the (n+1) period is obtained by using Eq. 3.

Thus, in the first preferred embodiment, by adding the coefficient of variation to the initial value $\alpha_1$ which is the reference conversion factor, the quantization step conversion factor $\alpha_{n+1}$ in the (n+1) period is obtained. Then, in Eq. 9, a value obtained by subtracting the average output bit rate $C_n$ of the converted second stream in the n period from the total target bit rate T of the second stream is used as the coefficient of variation. As another method, as shown in Eq. 10, a value obtained by subtracting a logarithmic value of the average output bit rate $C_n$ of the converted second stream in the n period from a logarithmic value of the total target bit rate T of the second stream may be used as the coefficient of variation. In Eq. 10, "k" represents an adjustment factor used for adjusting the coefficient of variation and is a positive value.

$$\alpha_{n+1}=k*(\log(T)-\log(C_n))+\alpha_1 \quad \text{(Eq. 10)}$$

The advantage of calculation of the coefficient of variation by using Eq. 10 is that it is possible to control the quantization step conversion factor not to significantly vary even if the difference between the target bit rate and the converted bit rate locally becomes large.

In order to control the quantization step conversion factor with higher precision, a look-up table may be used. In Eq. 11, $\omega$ represents a look-up table which inputs the total target bit rate T of the second stream and the average output bit rate $C_n$ of the converted second stream in the n period and outputs the coefficient of variation. With this, through an experiment or the like, it is possible to assign a more optimal coefficient of variation.

$$\alpha_{n+1}=\omega(T,C_n)+\alpha_1 \quad \text{(Eq. 11)}$$

For the above calculation of the coefficient of variation in Eq. 9, the average output bit rate $C_n$ in the n period is used. Herein, as shown in Eq. 12, the average period bit rate $AC_n$ from the (n−M+1) period to the n period may be used, instead of the average output bit rate $C_n$.

$$\alpha_{n+1}=k*(T-AC_n)+\alpha_1 \quad \text{(Eq. 12)}$$

With Eq. 12, it is possible to gently control the coefficient of variation, without largely depending on local variation of the average output bit rate $C_n$. Similarly, in Eqs. 10 and 11, the average period bit rate $AC_n$ may be used, instead of the average output bit rate $C_n$.

Further, for the above calculation of the coefficient of variation in Eq. 9, the value obtained by subtracting the average output bit rate $C_n$ of the converted second stream in the n period from the total target bit rate T of the second stream is used. Herein, as shown in Eq. 13, the value obtained by this subtraction may be further divided by the average input bit rate $S_n$ of the first stream in the n period.

$$\alpha_{n+1} = k * \left(\frac{T - C_n}{S_n}\right) + \alpha_1 \quad \text{(Eq. 13)}$$

With Eq. 13, even if the bit rate of the first stream locally varies significantly, it is possible to avoid a large effect of this on the coefficient of variation. Similarly, in Eqs. 10 and 11, the value obtained by subtraction of the logarithmic values or the output of the look-up table may be further divided by the average input bit rate $S_n$ of the first stream in the n period.

Further, both the ideas for the methods of calculating the coefficient of variation by using Eqs. 12 and 13 may be taken. Specifically, as shown in Eq. 14, the average period bit rate $AC_n$ is used instead of the average output bit rate $C_n$ and the value obtained by subtraction is divided by the average input bit rate $S_n$. With this, it is possible to more gently control the coefficient of variation. Similarly, in Eqs. 10 and 11, there may be a case where the average period bit rate $AC_n$ is used instead of the average output bit rate $C_n$ and the value obtained by subtraction of the logarithmic values or the output of the look-up table is further divided by the average input bit rate $S_n$.

$$\alpha_{n+1} = k * \left(\frac{T - AC_n}{S_n}\right) + \alpha_1 \quad \text{(Eq. 14)}$$

In Eq. 13, the value obtained by subtracting the average output bit rate $C_n$ from the total target bit rate T is divided by the average input bit rate $S_n$. Instead of this, as shown in Eq. 15, the value obtained by subtraction may be divided by the average period bit rate $AS_n$ of the first stream from the (n−M+1) period to the n period. With this method, it is possible to more gently control the coefficient of variation without any effect of local variation of the bit rate of the first stream. Similarly, in Eqs. 10 and 11, the value obtained by subtraction of the logarithmic values or the output of the look-up table may be divided by the average period bit rate $AS_n$.

$$\alpha_{n+1} = k * \left(\frac{T - C_n}{AS_n}\right) + \alpha_1 \quad \text{(Eq. 15)}$$

Further, as shown in Eq. 16, the average period bit rate $AC_n$ may be used instead of the average output bit rate $C_n$ and the average period bit rate $AS_n$ may be used instead of the average input bit rate $S_n$. With this, it is possible to more gently control the coefficient of variation. Similarly, in Eqs. 10 and 11, there may be a case where the average period bit rate $AC_n$ is used instead of the average output bit rate $C_n$ and the value obtained by subtraction of the logarithmic values or the output of the look-up table is further divided by the average period bit rate $AS_n$.

$$\alpha_{n+1} = k * \left(\frac{T - AC_n}{AS_n}\right) + \alpha_1 \quad \text{(Eq. 16)}$$

The Second Preferred Embodiment

Next, the second preferred embodiment will be discussed. Also in the second preferred embodiment, the quantization step conversion factor is calculated and by using Eq. 3, the quantization step value Q of the second stream is calculated. The method of calculating the quantization step conversion factor, however, is different from that in the first preferred embodiment. In the first preferred embodiment, the initial value $\alpha_1$ of the quantization step conversion factor is obtained and by using the initial value $\alpha_1$ as the reference conversion factor, the variations from the reference conversion factor are sequentially obtained. On the other hand, in the second preferred embodiment, at the point of time when the n period is finished, a target setting bit rate $T_{n+1}$ of the second stream in the (n+1) period is determined and by using the determined target setting bit rate $T_{n+1}$, the quantization step conversion factor $\alpha_{n+1}$ in the (n+1) period is calculated.

After determining the target setting bit rate $T_{n+1}$ in the (n+1) period, the quantization step conversion factor $\alpha_{n+1}$ is calculated by the same method as that using Eq. 5. Specifically, by using the function f shown in Eqs. 6 to 8, the quantization step conversion factor $\alpha_{n+1}$ is calculated. More specifically, as shown Eq. 17, by substituting the ratio between the target setting bit rate $T_{n+1}$ in the (n+1) period and the average input bit rate $S_n$ in the n period into the function f, the quantization step conversion factor $\alpha_{n+1}$ is calculated.

$$\alpha_{n+1} = f(T_{n+1}/S_n) \quad \text{(Eq. 17)}$$

Alternatively, as shown in Eq. 18, by using the average period bit rate $AS_n$ from the (n−M+1) period to the n period, instead of the average input bit rate $S_n$ in the n period, the quantization step conversion factor $\alpha_{n+1}$ may be calculated.

$$\alpha_{n+1} = f(T_{n+1}/AS_n) \quad \text{(Eq. 18)}$$

Eq. 19 is an equation for calculation of the target setting bit rate $T_{n+1}$ in the (n+1) period. In other words, it represents the target setting bit rate $T_{n+1}$ in the (n+1) period calculated by the transcoder 1 at the point of time when the n period is finished. Specifically, assuming that a value obtained by dividing the average output bit rate $C_n$ of the converted second stream in the n period by the target setting bit rate $T_n$ in the n period is determined as a target ratio, the target setting bit rate $T_{n+1}$ in the (n+1) period can be calculated by dividing the total target bit rate T of the second stream by the target ratio.

$$T_{n+1} = k * \frac{T}{\frac{C_n}{T_n}} \quad \text{(Eq. 19)}$$

In Eq. 19, "k" is a positive factor and a factor for adjusting the target setting bit rate $T_{n+1}$. Thus, the ratio (target ratio) between the bit rate and the target in the n period is calculated by $C_n/T_n$ and then the total target bit rate T is divided by the target ratio to adjust the target setting bit rate $T_{n+1}$ in the (n+1) period, thereby controlling the bit rate to approximate the target bit rate on the whole.

Though $C_n/T_n$ is used as the target ratio (although being multiplied by "k") in Eq. 19, the target ratio may be obtained by substituting $C_n/T_n$ into the function θ, as shown in Eq. 20.

$$T_{n+1} = k * \frac{T}{\theta\left(\frac{C_n}{T_n}\right)} \quad \text{(Eq. 20)}$$

As shown in Eq. 20, $C_n/T_n$ is substituted into the function θ, and then the target setting bit rate $T_{n+1}$ is calculated by using the total target bit rate T and the output of the function θ. In Eq. 20, "k" is a positive factor for adjusting the target setting bit rate $T_{n+1}$. Eq. 21 is an equation which shows a specific case of the function θ.

$$\theta(x) = \begin{cases} x - b_0 & (x \geq 1 + c_0) \\ a_0 * (x-1)^3 + 1 & (1 + c_0 > x \geq 1) \\ a_1 * (x-1)^3 + 1 & (1 > x \geq 1 - c_1) \\ x + b_1 & (1 - c_1 > x) \end{cases} \quad \text{(Eq. 21)}$$

Figure 3:
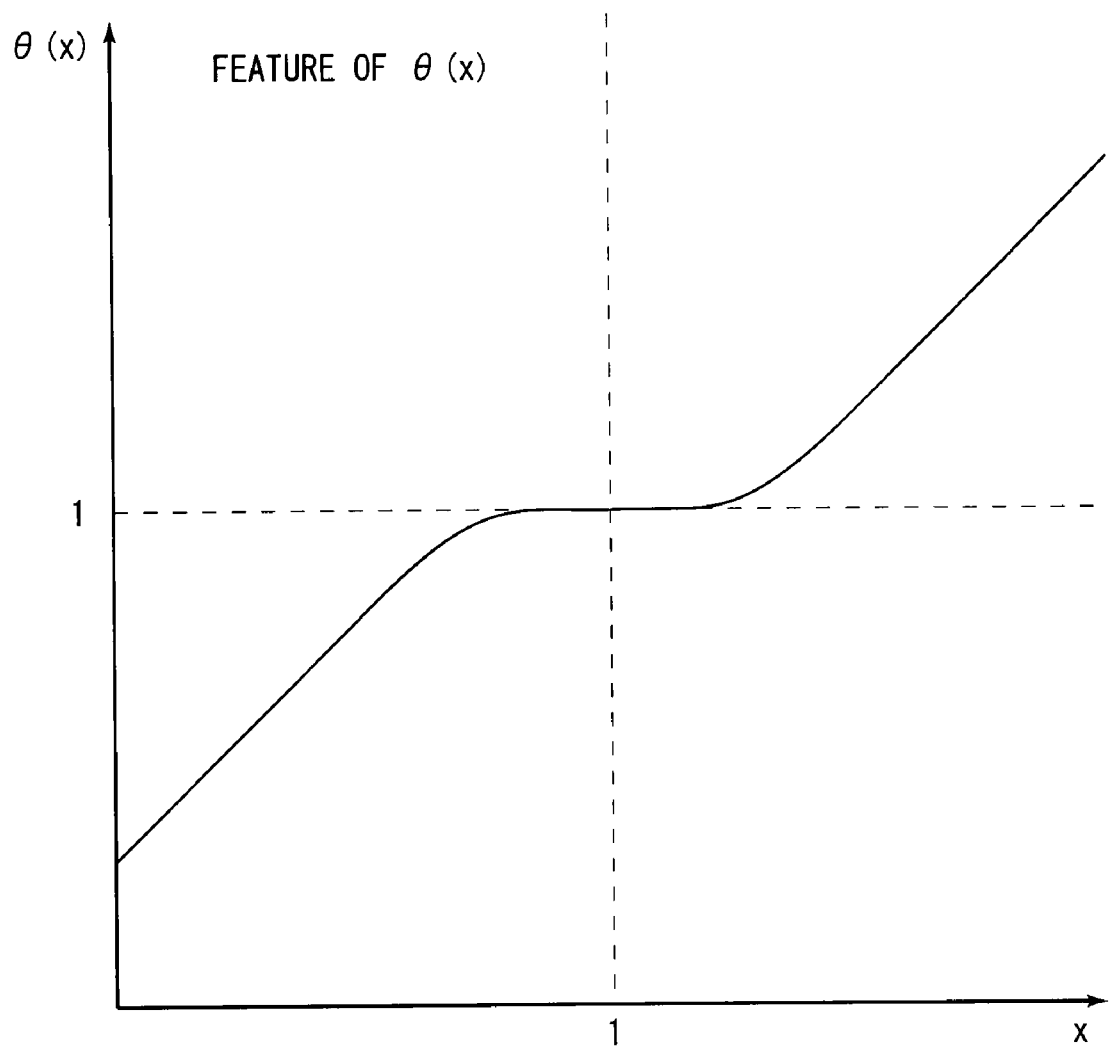
FIG. 3 is a view showing a feature of function θ.

The relation of $a_0$, $a_1$, $b_0$, $b_1$, $c_0$ and $c_1$ in Eq. 21 is shown in Eq. 22. Further, a feature of the function θ represented under this condition is shown in FIG. 3.

$$a_0 > 0, \quad a_1 > 0 \quad \text{(Eq. 22)}$$
$$c_0 = \frac{1}{\sqrt{3*a_0}}, \quad c_1 = \frac{1}{\sqrt{3*a_1}}$$
$$b_0 = \frac{2}{3}*c_0, \quad b_1 = \frac{2}{3}*c_1$$

Thus, the function θ has a feature where if an input value is close to 1, an output does not largely vary from "1". Then, in the feature, from the point where the input value becomes larger than a certain threshold value (or from the point where the input value becomes smaller than another certain threshold value), the output value linearly varies. In the specific case of Eqs. 21 and 22, from the point where the input value becomes larger than $(1+c_0)$ or becomes smaller than $(1-c_1)$, variation of the output value becomes larger.

By using the function θ, it is possible to avoid large variation of the target setting bit rate $T_{n+1}$ from the total target bit rate T if ($C_n/T_n$) slightly deviates from "1". If the target ratio deviates in a relatively large range, it is possible to control the target setting bit rate $T_{n+1}$ to so vary as to optimally follow the target.

In the exemplary case of FIG. 3, the function θ has a feature of symmetry (point symmetry with respect to the point (1, 1)). Specifically, by using an area where the value of $(C_n/T_n)$ is 1 as a boundary, the rate of change is symmetrical thereabout. More specifically, the rate of increase of the target ratio at the point where the value of $(C_n/T_n)$ is larger than 1 and the rate of decrease of the target ratio at the point where the value of $(C_n/T_n)$ is smaller than 1 are equal to each other. Herein, the rate of change may be asymmetrical about the boundary where the value of $(C_n/T_n)$ is 1. Specifically, the rate of increase of the target ratio at the point where the value of $(C_n/T_n)$ is larger than 1 and the rate of decrease of the target ratio at the point where the value of $(C_n/T_n)$ is smaller than 1 may be different from each other. In other words, by adjusting the values of $a_0$ and $a_1$, the function θ may have a feature of asymmetry. For example, by increasing $a_0$ and decreasing $a_1$, when the bit rate becomes larger than a target value, it is possible to control the bit rate to quickly get back to the target value, and when the bit rate becomes smaller than the target value, it is possible to control the bit rate to gently get back to the target value.

Though the value obtained by dividing the average output bit rate $C_n$ of the second stream in the n period by the target setting bit rate $T_n$ is used as the target ratio in Eq. 19, this target ratio is further adjusted in Eq. 23.

$$T_{n+1} = k * \frac{T}{\frac{S_{n-1}}{S_n} * \frac{C_n}{T_n}} \quad \text{(Eq. 23)}$$

In Eq. 23, the target ratio is multiplied by $S_{n-1}/S_n$. This multiplier factor $S_{n-1}/S_n$ is a value obtained by dividing the average input bit rate $S_{n-1}$ of the first stream in the (n−1) period by the average input bit rate $S_n$ of the first stream in the n period and may be referred to as a period ratio of the average input bit rate. Multiplying the target ratio by the period ratio can adjust the target ratio.

Thus, multiplying the target ratio by the period ratio can correct the local variation of the target ratio. For example, if the average input bit rate $S_n$ locally becomes smaller, sometimes the target ratio $C_n/T_n$ accordingly becomes smaller. Also in such a case, multiplying the target ratio $C_n/T_n$ by the period ratio $S_{n-1}/S_n$ (the period ratio is larger than 1 in this case) makes it possible to adjust the target ratio and avoid large variation of the target setting bit rate $T_{n+1}$. Conversely, if the average input bit rate $S_n$ locally becomes larger, the period ratio $S_{n-1}/S_n$ is smaller than 1 and this suppresses sharp increase of the target ratio.

In the method of calculating the target setting bit rate $T_{n+1}$ by using the function θ shown in Eq. 20, similarly, the target ratio may be adjusted by being multiplied by the period ratio. The target setting bit rate $T_{n+1}$ obtained by this method is shown in Eq. 24. Also in this case, it is possible to adjust the target ratio with variation of the average input bit rate and avoid large variation of the target setting bit rate $T_{n+1}$.

$$T_{n+1} = k * \frac{T}{\frac{S_{n-1}}{S_n} * \theta\left(\frac{C_n}{T_n}\right)} \quad \text{(Eq. 24)}$$

In Eq. 23, the value obtained by dividing the average input bit rate $S_{n-1}$ of the first stream in the (n−1) period by the average input bit rate $S_n$ of the first stream in the n period is used as the period ratio. On the other hand, in the case where the average input bit rate $S_{n+1}$ of the first stream in the (n+1) period can be taken in advance, the average input bit rate $S_{n+1}$ may be used. The case where the average input bit rate $S_{n+1}$ can be taken in advance is a case where there is enough time to buffer the information on the average input bit rate $S_{n+1}$ and then calculate the target setting bit rate $T_{n+1}$ in the (n+1) period. In other words, this is a case where some processing delay is allowed. Eq. 25 is an equation for calculation of the target setting bit rate $T_{n+1}$ by using the average input bit rate $S_{n+1}$.

$$T_{n+1} = k * \frac{T}{\frac{S_n}{S_{n+1}} * \frac{C_n}{T_n}} \quad \text{(Eq. 25)}$$

As shown in Eq. 25, as the period ratio used is $S_n/S_{n+1}$, that is, a value obtained by dividing the average input bit rate $S_n$ of the first stream in the n period by the average input bit rate $S_{n+1}$ of the first stream in the (n+1) period. Thus, by using the average input bit rate $S_{n+1}$ of the first stream in the (n+1) period, it is possible to control the target setting bit rate $T_{n+1}$ with higher precision. In other words, it is possible to optimally control the target bit rate by using the latest input information.

In Eq. 24, the target ratio obtained by using the function $\theta$ is multiplied by the period ratio. Also in this case, similarly, the period ratio $S_n/S_{n+1}$ may be used instead of the period ratio $S_{n-1}/S_n$. Eq. 26 is an equation for calculation using the period ratio $S_n/S_{n+1}$. Also in this case, it is possible to control the target setting bit rate $T_{n+1}$ with higher precision.

$$T_{n+1} = k * \frac{T}{\frac{S_n}{S_{n+1}} * \theta\left(\frac{C_n}{T_n}\right)} \quad \text{(Eq. 26)}$$

In a case where the average input bit rate $S_{n+1}$ of the first stream in the (n+1) period is used as the period ratio, as shown in Eq. 27, instead of Eq. 17, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

$$\alpha_{n+1} = f(T_{n+1}/S_{n+1}) \quad \text{(Eq. 27)}$$

Further, in Eqs. 23 and 24, $S_{n-1}/S_n$ is used as the period ratio. Instead of $S_{n-1}/S_n$, the ratio between the average period bit rate $AS_{n-1}$ of past M periods including the (n−1) period and the average period bit rate $AS_n$ of past M periods including the n period may be used as the period ratio. In other words, in Eqs. 23 and 24, $AS_{n-1}/AS_n$ may be used, instead of $S_{n-1}/S_n$, as the period ratio. With this, it is possible to decrease the effect of local variation and optimally control the target setting bit rate $T_{n+1}$.

Alternatively, if the average input bit rate $S_{n+1}$ of the first stream in the (n+1) period can be taken in advance, the ratio between the average period bit rate $AS_n$ of past M periods including the n period and the average period bit rate $AS_{n+1}$ of past M periods including the (n+1) period may be used as the period ratio. In other words, in Eqs. 23 and 24, $AS_n/AS_{n+1}$ may be used, instead of $S_{n-1}/S_n$, as the period ratio. With this, it is possible to decrease the effect of local variation and control the target setting bit rate $T_{n+1}$ with higher precision by using the latest input bit rate.

In a case where the average period bit rate $AS_{n+1}$ of past M periods including the (n+1) period is used as the period ratio, as shown in Eq. 28, instead of Eq. 18, the quantization step conversion factor $\alpha_{n+1}$ in the (n+1) period can be calculated by substituting the ratio between the target setting bit rate $T_{n+1}$ in the (n+1) period and the average period bit rate $AS_{n+1}$ of past M periods including the (n+1) period into the function f.

$$\alpha_{n+1} = f(T_{n+1}/AS_{n+1}) \quad \text{(Eq. 28)}$$

Further, though the method of calculating the target setting bit rate $T_{n+1}$ of the second preferred embodiment has been discussed by using Eqs. 19, 20, 23 to 26, in all the cases discussed in this preferred embodiments including the case discussed by using these equations, the average period bit rate $AC_n$ from the (n−M+1) period to the n period may be used instead of the average output bit rate $C_n$ in the n period. For example, in Eqs. 19, 20, 23 to 26, $AC_n$ is used instead of $C_n$. This makes it possible to more gently control the target setting bit rate $T_{n+1}$.

The Third Preferred Embodiment

Next, the third preferred embodiment of the present invention will be discussed. Also in the third preferred embodiment, the quantization step conversion factor is calculated, and by using Eq. 3, the quantization step value Q of the second stream is calculated. Further, in the third preferred embodiment, like in the second preferred embodiment, the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated.

After determining the target setting bit rate $T_{n+1}$ in the (n+1) period, the quantization step conversion factor $\alpha_{n+1}$ is calculated in the same method as that discussed by using Eq. 5. In other words, by using the function f shown in Eqs. 6 to 8, the quantization step conversion factor $\alpha_{n+1}$ is calculated. Specifically, as shown in Eq. 17, the quantization step conversion factor $\alpha_{n+1}$ is calculated by substituting the ratio between the target setting bit rate $T_{n+1}$ in the (n+1) period and the average input bit rate $S_n$ in the n period into the function f. Alternatively, as shown in Eq. 18, the quantization step conversion factor $\alpha_{n+1}$ may be calculated by using the average period bit rate $AS_n$ from the (n−M+1) period to the n period, instead of the average input bit rate $S_n$.

Eq. 29 is an equation for calculation of the target setting bit rate $T_{n+1}$ in the (n+1) period. In other words, it represents the target setting bit rate $T_{n+1}$ in the (n+1) period calculated by the transcoder 1 at the point of time when the n period is finished. Specifically, assuming that a value obtained by subtracting the average output bit rate $C_n$ of the converted second stream in the n period from the target setting bit rate $T_n$ in the n period is determined as a target difference, the target setting bit rate $T_{n+1}$ in the (n+1) period can be calculated by adding the target difference to the total target bit rate T of the second stream.

$$T_{n+1} = T + k*(T_n - C_n) \quad \text{(Eq. 29)}$$

In Eq. 29, "k" is a positive factor and a factor for adjusting the target setting bit rate $T_{n+1}$. Thus, the difference between the bit rate and the target in the n period is calculated by $(T_n - C_n)$ and then the target difference is added to the total target bit rate T, to thereby control the output stream to approximate the target bit rate.

Though $(T_n - C_n)$ is used as the target difference (although being multiplied by "k") in Eq. 29, the target difference may be obtained by substituting $(T_n - C_n)$ into the function $\phi$, as shown in Eq. 30.

$$T_{n+1} = T + \phi(T_n - C_n) \quad \text{(Eq. 30)}$$

As shown in Eq. 30, $(T_n - C_n)$ is substituted into the function $\phi$, and then the target setting bit rate $T_{n+1}$ is calculated by using the total target bit rate T and the output of the function $\phi$. Eq. 31 is an equation which shows a specific case of the function $\phi$.

$$\phi(x) = \begin{cases} x - b_0 & (x \geq c_0) \\ a_0 * x^3 & (c_0 > x \geq 0) \\ a_1 * x^3 & (0 > x \geq -c_1) \\ x + b_1 & (-c_1 > x) \end{cases} \quad \text{(Eq. 31)}$$

Figure 4:
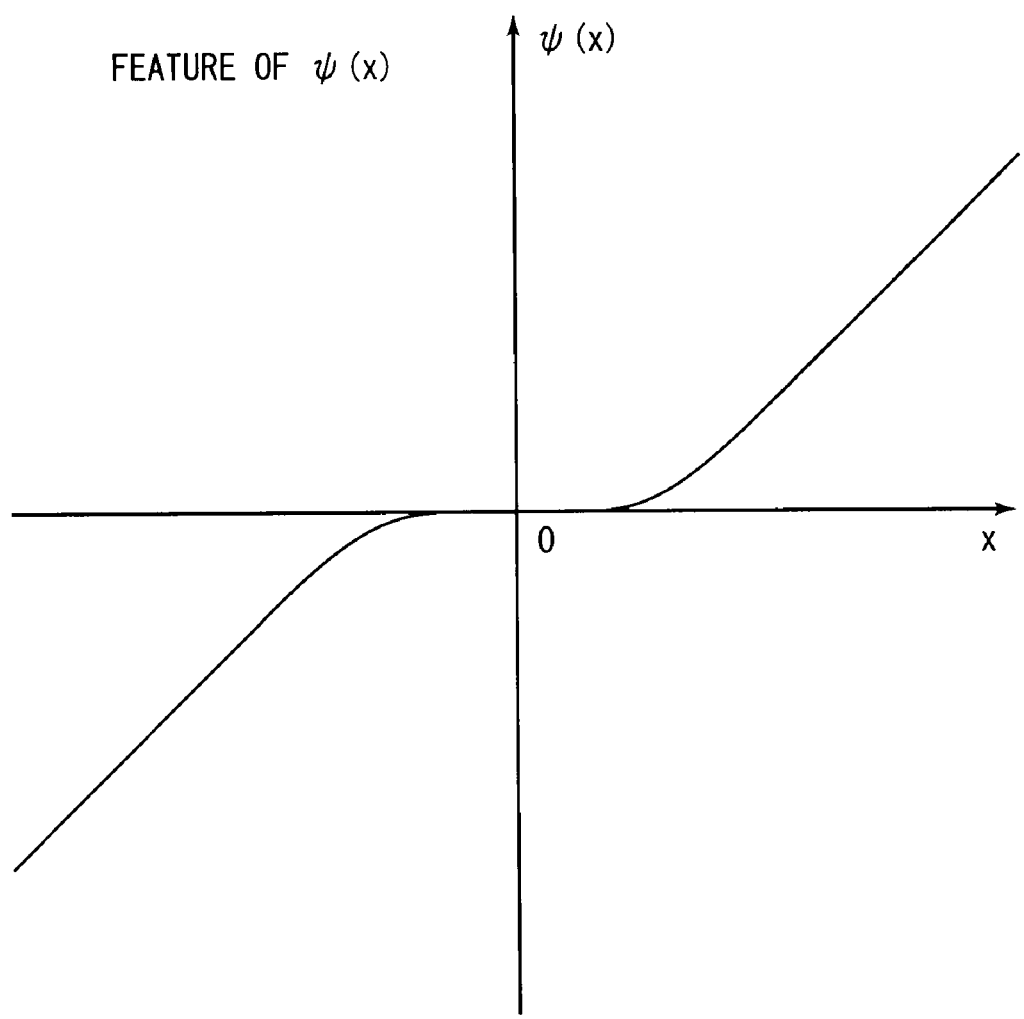
FIG. 4 is a view showing a feature of function φ.

The relation of $a_0$, $a_1$, $b_0$, $b_1$, $c_0$ and $c_1$ in Eq. 31 is shown in Eq. 32. Further, a feature of the function $\phi$ represented under this condition is shown in FIG. 4.

$$a_0 > 0, \quad a_1 > 0 \quad \text{(Eq. 32)}$$
$$c_0 = \frac{1}{\sqrt{3 * a_0}}, \quad c_1 = \frac{1}{\sqrt{3 * a_1}}$$
$$b_0 = \frac{2}{3} * c_0, \quad b_1 = \frac{2}{3} * c_1$$

Thus, the function $\phi$ has a feature where if an input value is close to 0, an output does not largely vary from "0". Then, in the feature, from the point where the input value becomes larger than a certain threshold value (or from the point where the input value becomes smaller than another certain threshold value), the output value linearly varies. In the specific case of Eqs. 31 and 32, from the point where the input value becomes larger than $c_0$ or becomes smaller than $-c_1$, the output value largely varies.

By using this function $\phi$, it is possible to avoid large variation of the target setting bit rate $T_{n+1}$ from the total target bit rate T if $(T_n - C_n)$ slightly deviates from "0". If the target difference deviates in a relatively large range, it is possible to control the target setting bit rate $T_{n+1}$ to so vary as to optimally follow the target.

In the exemplary case of FIG. 4, the function $\phi$ has a feature of symmetry (point symmetry with respect to the point (0, 0)). Specifically, by using an area where the value of $(T_n - C_n)$ is 0 as a boundary, the rate of change is symmetrical thereabout. More specifically, the rate of increase of the target difference at the point where the value of $(T_n - C_n)$ is larger than 0 and the rate of decrease of the target difference at the point where the value of $(T_n - C_n)$ is smaller than 0 are equal to each other. Herein, the rate of change may be asymmetrical about the boundary where the value of $(T_n - C_n)$ is 0. Specifically, the rate of increase of the target difference at the point where the value of $(T_n - C_n)$ is larger than 0 and the rate of decrease of the target difference at the point where the value of $(T_n - C_n)$ is smaller than 0 may be different from each other. In other words, by adjusting the values of $a_0$ and $a_1$, the function $\phi$ may have a feature of asymmetry. For example, by increasing $a_1$ and decreasing $a_0$, when the bit rate becomes larger than a target value, it is possible to control the bit rate to quickly get back to the target value, and when the bit rate becomes smaller than the target value, it is possible to control the bit rate to gently get back to the target value.

Though the value obtained by subtracting the average output bit rate $C_n$ of the second stream in the n period from the target setting bit rate $T_n$ in the n period is used as the target difference in Eq. 29, this target difference is further adjusted in Eq. 33.

$$T_{n+1} = T + k * \frac{S_n}{S_{n-1}} * (T_n - C_n) \quad \text{(Eq. 33)}$$

In Eq. 33, the target difference is multiplied by $S_n/S_{n-1}$. This multiplier factor $S_n/S_{n-1}$ is the period ratio obtained by dividing the average input bit rate $S_n$ of the first stream in the n period by the average input bit rate $S_{n-1}$ of the first stream in the (n−1) period. Multiplying the target difference by the period ratio can adjust the target difference.

Thus, multiplying the target difference by the period ratio can correct the local variation of the target difference. For example, if the average input bit rate $S_n$ in the n period locally becomes smaller than that in the (n−1) period, sometimes the target difference $(T_n - C_n)$ accordingly varies largely. Also in such a case, multiplying the target difference $(T_n - C_n)$ by the period ratio $S_n/S_{n-1}$ (the period ratio is smaller than 1 in this case) makes it possible to adjust the target difference and avoid large variation of the target setting bit rate $T_{n+1}$.

In the method of calculating the target setting bit rate $T_{n+1}$ by using the function $\phi$ shown in Eq. 30, similarly, the target difference may be adjusted by being multiplied by the period ratio. The target setting bit rate $T_{n+1}$ obtained by this method is shown in Eq. 34. Also in this case, it is possible to adjust the target difference with variation of the average input bit rate and avoid large variation of the target setting bit rate $T_{n+1}$.

$$T_{n+1} = T + \frac{S_n}{S_{n-1}} * \phi(T_n - C_n) \quad \text{(Eq. 34)}$$

In Eq. 33, the value obtained by dividing the average input bit rate $S_n$ of the first stream in the n period by the average input bit rate $S_{n-1}$ of the first stream in the (n−1) period is used as the period ratio. On the other hand, in the case where the average input bit rate $S_{n+1}$ of the first stream in the (n+1) period can be taken in advance, the average input bit rate $S_{n+1}$ may be used. The case where the average input bit rate $S_{n+1}$ can be taken in advance is, as discussed above, a case where there is enough time to buffer the information on the average input bit rate $S_{n+1}$ and then calculate the target setting bit rate $T_{n+1}$ in the (n+1) period. In this case, in Eq. 33, $S_{n+1}/S_n$ is used, instead of $S_n/S_{n-1}$, as the period ratio. Thus, by using the average input bit rate $S_{n+1}$ of the first stream in the (n+1) period, it is possible to control the target setting bit rate $T_{n+1}$ with higher precision.

In Eq. 34, the target difference obtained by using the function $\phi$ is multiplied by the period ratio. Also in this case, similarly, the period ratio $S_{n+1}/S_n$ may be used instead of the period ratio $S_n/S_{n-1}$. Also in this case, it is possible to control the target setting bit rate $T_{n+1}$ with higher precision.

In a case where the average input bit rate $S_{n+1}$ of the first stream in the (n+1) period is used as the period ratio, as shown in Eq. 27, instead of Eq. 17, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

Further, in Eqs. 33 and 34, $S_n/S_{n-1}$ is used as the period ratio. Instead of $S_n/S_{n-1}$, the ratio between the average period bit rate $AS_n$ of past M periods including the n period and the average period bit rate $AS_{n-1}$ of past M periods including the (n−1) period may be used as the period ratio. In other words, in Eqs. 33 and 34, $AS_n/AS_{n-1}$ may be used, instead of $S_n/S_{n-1}$, as the period ratio. With this, it is possible to decrease the effect of local variation and optimally control the target setting bit rate $T_{n+1}$.

Alternatively, if the average input bit rate $S_{n+1}$ of the first stream in the (n+1) period can be taken in advance, the ratio between the average period bit rate $AS_{n+1}$ of past M periods including the (n+1) period and the average period bit rate $AS_n$ of past M periods including the n period may be used as the period ratio. In other words, in Eqs. 33 and 34, $AS_{n+1}/AS_n$ may be used, instead of $S_n/S_{n-1}$, as the period ratio. With this, it is possible to decrease the effect of local variation and control the target setting bit rate $T_{n+1}$ with higher precision by using the latest input bit rate.

In a case where the average period bit rate $AS_{n+1}$ of past M periods including the (n+1) period is used as the period ratio, as shown in Eq. 28, instead of Eq. 18, the quantization step conversion factor $\alpha_{n+1}$ in the (n+1) period can be calculated by substituting the ratio between the target setting bit rate $T_{n+1}$ in the (n+1) period and the average period bit rate $AS_{n+1}$ of past M periods including the (n+1) period into the function f.

Further, though the method of calculating the target setting bit rate $T_{n+1}$ of the third preferred embodiment has been discussed by using Eqs. 29, 30, 33 and 34, in all the calculation methods discussed in the third preferred embodiment including the cases discussed by using these equations, the average period bit rate $AC_n$ from the (n−M+1) period to the n period may be used instead of the average output bit rate $C_n$ in the n period. For example, in Eqs. 29, 30, 33 and 34, $AC_n$ may be used instead of $C_n$. This makes it possible to more gently control the target setting bit rate $T_{n+1}$.

The Fourth Preferred Embodiment

Next, the fourth preferred embodiment of the present invention will be discussed. Also in the fourth preferred embodiment, like in the third preferred embodiment, the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated. In the fourth preferred embodiment, the method of determining the target setting bit rate $T_{n+1}$ of the second stream in the (n+1) period is different from that of the third preferred embodiment.

Eq. 35 is an equation for calculation of the target setting bit rate $T_{n+1}$ in the (n+1) period. Like in the third preferred embodiment, the value obtained by subtracting the average output bit rate $C_n$ of the converted second stream in the n period from the target setting bit rate $T_n$ in the n period is used as the target difference. Though the target difference is adjusted, however, by multiplying the target difference by the period ratio in the third preferred embodiment, the target difference is multiplied by a period difference in the fourth preferred embodiment, as shown in Eq. 35.

$$T_{n+1}=T+k*(S_n-S_{n-1})*(T_n-C_n) \quad \text{(Eq. 35)}$$

In Eq. 35, the target difference is multiplied by $(S_n-S_{n-1})$. This multiplier factor $(S_n-S_{n-1})$ is the period difference obtained by subtracting the average input bit rate $S_{n-1}$ of the first stream in the (n−1) period from the average input bit rate $S_n$ of the first stream in the n period. Multiplying the target difference by the period difference can adjust the target difference. In Eq. 35, the factor "k" is a positive factor for adjusting the target setting bit rate $T_{n+1}$.

Thus, multiplying the target difference by the period difference can correct the local variation of the target difference.

For example, if the average input bit rate $S_n$ gradually becomes smaller, sometimes the average output bit rate $C_n$ accordingly becomes smaller and target difference $(T_n-C_n)$ becomes a positive value. Also in such a case, the period difference $(S_n-S_{n-1})$ becomes a negative value, to thereby make such a correction that the target setting bit rate $T_{n+1}$ should not be set larger. In other words, if the average input bit rate $S_n$ becomes smaller, contrary to this variation, the target setting bit rate $T_{n+1}$ is controlled not to become larger.

Though $(T_n-C_n)$ is used as the target difference (although being multiplied by "k") in Eq. 35, the target difference may be obtained by substituting $(T_n-C_n)$ into the function φ, as shown in Eq. 36. As the function φ, for example, the functions shown in Eqs. 30 to 32 and FIG. 4 may be similarly used.

$$T_{n+1}=T+(S_n-S_{n-1})*\phi(T_n-C_n) \quad \text{(Eq. 36)}$$

By using this function φ, it is possible to avoid large variation of the target setting bit rate $T_{n+1}$ from the total target bit rate T if the target difference $(T_n-C_n)$ slightly deviates from "0". If the target difference deviates in a relatively large range, it is possible to control the target setting bit rate $T_{n+1}$ to so vary as to optimally follow the target.

Though, in Eq. 35, the target difference is multiplied by the period difference $(S_n-S_{n-1})$ and further multiplied by the factor "k" to adjust the target setting bit rate $T_{n+1}$, the period difference $(S_n-S_{n-1})$ may be substituted into the function φ as shown in Eq. 37. With this, as compared with the case where the target difference is multiplied by the constant factor "k", it is possible to control the target setting bit rate $T_{n+1}$ with higher precision. The function φ is not limited particularly, but the optimal one may be selected in consideration of the relation between the size of the period difference and the rate of variation of the target setting bit rate $T_{n+1}$.

$$T_{n+1}=T+(T_n-C_n)*\phi(S_n-S_{n-1}) \quad \text{(Eq. 37)}$$

Though, also in Eq. 36, the target difference (the output of the function φ) is multiplied by the period difference $(S_n-S_{n-1})$ to adjust the target setting bit rate $T_{n+1}$, the period difference $(S_n-S_{n-1})$ may be substituted into the function φ as shown in Eq. 38. With this, it is possible to control the target setting bit rate $T_{n+1}$ with higher precision, together with the control by the function φ. The function φ is not limited particularly, but the optimal one may be selected in consideration of the relation between the size of the period difference and the rate of variation of the target setting bit rate $T_{n+1}$.

$$T_{n+1}=T+\phi(T_n-C_n)*\phi(S_n-S_{n-1}) \quad \text{(Eq. 38)}$$

In the method of calculating the target setting bit rate $T_{n+1}$ discussed by using Eqs. 35 and 37, the target difference $(T_n-C_n)$ is multiplied by the period difference. On the other hand, as shown in Eq. 39, the period difference may be added to the target difference. In Eq. 39, "h" is a positive factor for adjusting the target setting bit rate $T_{n+1}$. Thus, by adding the period difference to the target difference, it is possible to control the target setting bit rate $T_{n+1}$ with a feature different from that in the case of multiplication.

$$T_{n+1}=T+h*(S_n-S_{n-1})+k*(T_n-C_n) \quad \text{(Eq. 39)}$$

In the method of calculating the target setting bit rate $T_{n+1}$ discussed by using Eqs. 36 and 38, the target difference φ $(T_n-C_n)$ is multiplied by the period difference. On the other hand, as shown in Eq. 40, the period difference may be added to the target difference. Thus, by adding the period difference to the target difference, it is possible to control the target setting bit rate $T_{n+1}$ with a feature different from that in the case of multiplication.

$$T_{n+1}=T+\phi(T_n-C_n)+\phi(S_n-S_{n-1}) \quad \text{(Eq. 40)}$$

In Eqs. 35 to 38, the value obtained by subtracting the average input bit rate $S_{n-1}$ of the first stream in the (n−1) period from the average input bit rate $S_n$ of the first stream in the n period is used as the period difference. Then, the target difference is multiplied by the period difference. On the other hand, in the case where the average input bit rate $S_{n+1}$ of the first stream in the (n+1) period can be taken in advance, the average input bit rate $S_{n+1}$ may be used. In this case, in Eqs. 35 to 38, $(S_{n+1}-S_n)$ is used, instead of $(S_n-S_{n-1})$, as the period difference. Thus, by using the average input bit rate $S_{n+1}$ of the first stream in the (n+1) period, it is possible to control the target setting bit rate $T_{n+1}$ with higher precision.

Also in Eqs. 39 and 40, the value obtained by subtracting the average input bit rate $S_{n-1}$ of the first stream in the (n−1) period from the average input bit rate $S_n$ of the first stream in the n period is used as the period difference. Then, the period difference is added to the target difference. On the other hand, in the case where the average input bit rate $S_{n+1}$ of the first stream in the (n+1) period can be taken in advance, the average input bit rate $S_{n+1}$ may be used. In this case, in Eqs. 39 and 40, $(S_{n+1}-S_n)$ is used, instead of $(S_n-S_{n-1})$, as the period difference. Thus, by using the average input bit rate $S_{n+1}$ of the first stream in the (n+1) period, it is possible to control the target setting bit rate $T_{n+1}$ with higher precision.

In a case where the average input bit rate $S_{n+1}$ of the first stream in the (n+1) period is used as the period difference, as shown in Eq. 27, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

In Eqs. 35 to 40, $(S_n-S_{n-1})$ is used as the period difference. Instead of this period difference, the difference between the average period bit rate $AS_n$ of past M periods including the n period and the average period bit rate $AS_{n-1}$ of past M periods including the (n−1) period may be used as the period difference. In other words, in Eqs. 35 to 40, $(AS_n-AS_{n-1})$ may be used, instead of $(S_n-S_{n-1})$, as the period difference. With this, it is possible to decrease the effect of local variation and optimally control the target setting bit rate $T_{n+1}$.

Alternatively, if the average input bit rate $S_{n+1}$ of the first stream in the (n+1) period can be taken in advance, the difference between the average period bit rate $AS_{n+1}$ of past M periods including the (n+1) period and the average period bit rate $AS_n$ of past M periods including the n period may be used as the period difference. In other words, in Eqs. 35 to 40, $(AS_{n+1}-AS_n)$ may be used, instead of $(S_n-S_{n-1})$, as the period difference. With this, it is possible to decrease the effect of local variation and control the target setting bit rate $T_{n+1}$ with higher precision by using the latest input bit rate.

In a case where the average period bit rate $AS_{n+1}$ of past M periods including the (n+1) period is used as the period difference, as shown in Eq. 28, the quantization step conversion factor $\alpha_{n+1}$ in the (n+1) period can be calculated by substituting the ratio between the target setting bit rate $T_{n+1}$ in the (n+1) period and the average period bit rate $AS_{n+1}$ of past M periods including the (n+1) period into the function f.

Further, though the method of calculating the target setting bit rate $T_{n+1}$ of the fourth preferred embodiment has been discussed by using Eqs. 35 to 40, in all the calculation methods discussed in the fourth preferred embodiment including the cases discussed by using these equations, the average period bit rate $AC_n$ from the (n−M+1) period to the n period may be used instead of the average output bit rate $C_n$ in the n period. For example, in Eqs. 35 to 40, $AC_n$ may be used instead of $C_n$. This makes it possible to more gently control the target setting bit rate $T_{n+1}$.

The Fifth Preferred Embodiment

Next, the fifth preferred embodiment of the present invention will be discussed. Also in the fifth preferred embodiment, like in the third or fourth preferred embodiment, the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated. In the fifth preferred embodiment, the method of determining the target setting bit rate $T_{n+1}$ of the second stream in the (n+1) period is different from that of the third or fourth preferred embodiment.

In Eqs. 33 and 34, the target difference is multiplied by the ratio between the average input bit rate $S_n$ in the n period and the average input bit rate $S_{n-1}$ in the (n−1) period as the period ratio. In the cases discussed in the third preferred embodiment, including Eqs. 33 and 34, the period ratio $S_n/AS_n$ may be used, instead of the period ratio $S_n/S_{n-1}$. In other words, the ratio between the average input bit rate $S_n$ in the n period and the average period bit rate $AS_n$ of past M periods including the n period is used as the period ratio. This makes it possible to gently evaluate the variation of the average input bit rate $S_n$.

Alternatively, in the cases discussed in the third preferred embodiment, including Eqs. 33 and 34, the period ratio $S_n/AS_{n-1}$ may be used, instead of the period ratio $S_n/S_{n-1}$. In other words, the ratio between the average input bit rate $S_n$ in the n period and the average period bit rate $AS_{n-1}$ of past M periods including the (n−1) period is used as the period ratio. Similarly, this makes it possible to gently evaluate the variation of the average input bit rate $S_n$.

Further, in the cases discussed in the third preferred embodiment, including Eqs. 33 and 34, it has been discussed that if the input bit rate can be taken in advance, the period ratio $S_{n+1}/S_n$ may be used instead of the period ratio $S_n/S_{n-1}$. Then, further instead of the period ratio $S_{n+1}/S_n$, the period ratio $S_{n+1}/AS_{n+1}$ may be used. In other words, the ratio between the average input bit rate $S_{n+1}$ in the (n+1) period and the average period bit rate $AS_{n+1}$ of past M periods including the (n+1) period is used as the period ratio. With this, it is possible to gently evaluate the variation of the average input bit rate $S_{n+1}$.

Alternatively, in the cases discussed in the third preferred embodiment, including Eqs. 33 and 34, the period ratio $S_{n+1}/AS_n$ may be used instead of the period ratio $S_{n+1}/S_n$. In other words, the ratio between the average input bit rate $S_{n+1}$ in the (n+1) period and the average period bit rate $AS_n$ of past M periods including the n period is used as the period ratio. With this, similarly, it is possible to gently evaluate the variation of the average input bit rate $S_{n+1}$.

In Eqs. 35 to 38, the target difference is multiplied by the difference between the average input bit rate $S_n$ in the n period and the average input bit rate $S_{n-1}$ in the (n−1) period, as the period difference. In the cases discussed in the fourth preferred embodiment, including Eqs. 35 to 38, the period difference $(S_n-AS_n)$ may be used, instead of the period difference $(S_n-S_{n-1})$. In other words, the difference between the average input bit rate $S_n$ in the n period and the average period bit rate $AS_n$ of past M periods including the n period is used as the period difference. This makes it possible to gently evaluate the variation of the average input bit rate $S_n$.

Alternatively, in the cases discussed in the fourth preferred embodiment, including Eqs. 35 to 38, the period difference $(S_n-AS_{n-1})$ may be used, instead of the period difference $(S_n-S_{n-1})$. In other words, the difference between the average input bit rate $S_n$ in the n period and the average period bit rate $AS_{n-1}$ of past M periods including the (n−1) period is used as the period difference. Similarly, this makes it possible to gently evaluate the variation of the average input bit rate $S_n$.

Further, in the cases discussed in the fourth preferred embodiment, including Eqs. 35 to 38, it has been discussed that if the input bit rate can be taken in advance, the period difference $(S_{n+1}-S_n)$ may be used instead of the period difference $(S_n-S_{n-1})$. Then, further instead of the period difference $(S_{n+1}-S_n)$, the period difference $(S_{n+1}-AS_{n+1})$ may be used. In other words, the difference between the average input bit rate $S_{n+1}$ in the (n+1) period and the average period bit rate $AS_{n+1}$ of past M periods including the (n+1) period is used as the period difference. With this, it is possible to gently evaluate the variation of the average input bit rate $S_{n+1}$.

Alternatively, in the cases discussed in the fourth preferred embodiment, including Eqs. 35 to 38, the period difference $(S_{n+1}-AS_n)$ may be used instead of the period difference $(S_{n+1}-S_n)$. In other words, the difference between the average input bit rate $S_{n+1}$ in the (n+1) period and the average period bit rate $AS_n$ of past M periods including the n period is used as the period difference. With this, similarly, it is possible to gently evaluate the variation of the average input bit rate $S_{n+1}$.

In Eqs. 39 and 40, the difference between the average input bit rate $S_n$ in the n period and the average input bit rate $S_{n-1}$ in the (n-1) period is added as the period difference to the target difference. In the cases discussed in the fourth preferred embodiment, including Eqs. 39 and 40, the period difference $(S_n-AS_n)$ may be used, instead of the period difference $(S_n-S_{n-1})$. Similarly, this makes it possible to gently evaluate the variation of the average input bit rate $S_n$. Alternatively, in the cases discussed in the fourth preferred embodiment, including Eqs. 39 and 40, the period difference $(S_n-AS_{n-1})$ may be used, instead of the period difference $(S_n-S_{n-1})$.

Further, in the cases discussed in the fourth preferred embodiment, including Eqs. 39 and 40, if the input bit rate can be taken in advance, the period difference $(S_{n+1}-AS_{n+1})$ may be used instead of the period difference $(S_{n+1}-S_n)$. Alternatively, the period difference $(S_{n+1}-AS_n)$ may be used instead of the period difference $(S_{n+1}-S_n)$. With this, similarly, it is possible to gently evaluate the variation of the average input bit rate $S_{n+1}$.

(Variations)

In the above-discussed second to fifth preferred embodiments, the target setting bit rate $T_{n+1}$ in the (n+1) period is obtained at the point of time when the n period is finished. Herein, in order to prevent extreme oscillation in the amount of generated codes, an upper limit value and a lower limit value of the target setting bit rate $T_{n+1}$ to be calculated may be set, as shown in Eq. 41.

$$T-\delta_L T \leq T_{n+1} \leq T+\delta_H T \qquad \text{(Eq. 41)}$$

In Eq. 41, $\delta_L T$ and $\delta_H T$ represent a lower limit variation range and an upper limit variation range of the target setting bit rate $T_{n+1}$, respectively. In the above-discussed second to fifth preferred embodiments, if the difference between the calculated target setting bit rate $T_{n+1}$ and the total target bit rate T exceeds the lower limit variation range $\delta_L T$ or the upper limit variation range $\delta_H T$, the target setting bit rate $T_{n+1}$ may be corrected so that the difference can fall within the variation range.

Alternatively, there may be a case where an upper limit threshold value LIM_H and a lower limit threshold value LIM_L of the quantization step conversion factor $\alpha_{n+1}$ calculated from the calculated target setting bit rate $T_{n+1}$ are set and the quantization step conversion factor $\alpha_{n+1}$ is so corrected as to fall within a range from the lower limit threshold value LIM_L to the upper limit threshold value LIM_H.

As discussed above, the quantization step conversion factor $\alpha_{n+1}$ is determined before a transcoding operation in the (n+1) period, and the value of this quantization step conversion factor $\alpha_{n+1}$ is used in the (n+1) period.

If the total input bit rate S of the first stream changes, however, for example, if the total input bit rate S of MPEG2 which is the input stream changes, the quantization step conversion factor $\alpha_{n+1}$ may be recalculated in accordance with the changed bit rate S.

In another case where a system, like a video recorder, in which the second stream is stored in a storage such as a hard disk or the like is constructed, the system can detect the remaining amount of hard disk capacity and adaptively change the total target bit rate T so as to be commensurate with the remaining amount. In this case, at the point when the total target bit rate T changes, the quantization step conversion factor $\alpha_{n+1}$ may be recalculated.

Further, though the target setting bit rate $T_{n+1}$ is calculated in the above preferred embodiments, the calculated target setting bit rate $T_{n+1}$ may be further controlled by using external parameters. For example, if the remaining amount x of hard disk capacity is small, or if the amount x of bits in a decoder buffer tends to increase and so on, the factor "k(x)" is generated by using these parameters x. Then, the target setting bit rate $T_{n+1}$ calculated in any one of the above preferred embodiments is multiplied by the external parameter k (x). The multiplication result, as shown in Eq. 42, is determined as the controlled target setting bit rate $T_{n+1}$.

$$T_{n+1}=k(x)*T_{n+1} \qquad \text{(Eq. 42)}$$

Though the target ratio is multiplied by the period ratio $(S_{n-1}/S_n)$ or the period ratio $(S_n/S_{n+1})$ in the second preferred embodiment, either one of these period ratios to be used may be selected by the user. Further, though the target ratio is multiplied by the period ratio $(AS_{n-1}/AS_n)$ or the period ratio $(AS_n/AS_{n+1})$, either one of these period ratios to be used may be selected by the user. There may be a case, for example, where if it is intended to perform processing with less delay, allowing little poor image quality, combination of $S_{n-1}$ and $S_n$ is selected, and if it is intended to perform processing for high image quality, allowing some delay, combination of $S_n$ and $S_{n+1}$ is selected.

Though the target difference is multiplied by the period ratio $(S_{n-1}/S_n)$ or the period ratio $(S_n/S_{n+1})$ in the third preferred embodiment, similarly, either one of these period ratios to be used may be selected by the user. Further, though the target difference is multiplied by the period ratio $(AS_{n-1}/AS_n)$ or the period ratio $(AS_n/AS_{n+1})$, either one of these period ratios to be used may be selected by the user.

Though the target difference is multiplied by or added to the period difference $(S_n-S_{n-1})$ or the period difference $(S_{n+1}-S_n)$ in the fourth preferred embodiment, similarly, either one of these period differences to be used may be selected by the user. Further, though the target difference is multiplied by or added to the period difference $(AS_n-AS_{n-1})$ or the period difference $(AS_{n+1}-AS_n)$, either one of these period differences to be used may be selected by the user.

In the function $\theta$ discussed in the second preferred embodiment and the function $\phi$ discussed in the fourth preferred embodiment, a variable $(a_0, a_1)$ is used. There may be a case where a plurality of combinations of this variable $(a_0, a_1)$ are prepared and these combinations are selectively used in accordance with the index indicating the complexity of an image. For example, the combinations may be selectively used depending on whether the image is a scene change part or a normal part. In other words, a plurality of patterns are prepared as the rate of change in advance and selectively used in accordance with the complexity of the image. The index indicating the complexity of the image is a value defined by the product of the amount of generated codes and an average quantization parameter value. As this value, a value defined by MPEG2 "Test Model 5" may be used.

While the invention has been shown and described in detail, the foregoing description is in all aspects illustrative and not restrictive. It is therefore understood that numerous modifications and variations can be devised without departing from the scope of the invention.

What is claimed is:

1. A transcoder for converting a first stream into a second stream, comprising:
   a part for acquiring a bit rate of a whole first stream;
   a part for setting a target bit rate of a whole second stream;
   a part for calculating a reference conversion factor on the basis of a ratio between said target bit rate of said whole second stream and said bit rate of said whole first stream;
   a variation coefficient calculation part for calculating a coefficient of variation from said target bit rate of said whole second stream and a bit rate of a second stream converted before a N period;
   a part for calculating a period conversion factor in a next (N+1) period by adding said coefficient of variation to said reference conversion factor; and
   a part for calculating a quantization step value of a second stream in the (N+1) period by multiplying a quantization step value of a first stream in the (N+1) period by said period conversion factor.

2. The transcoder according to claim 1, wherein said variation coefficient calculation part includes
   a part for calculating said coefficient of variation on the basis of a difference between said target bit rate of said whole second stream and said bit rate of said second stream converted before the N period.

3. The transcoder according to claim 1, wherein said variation coefficient calculation part includes
   a part for calculating said coefficient of variation on the basis of a difference between a logarithmic value of said target bit rate of said whole second stream and a logarithmic value of said bit rate of said second stream converted before the N period.

4. The transcoder according to claim 1, wherein said variation coefficient calculation part includes
   a look-up table for inputting said target bit rate of said whole second stream and said bit rate of said second stream converted before the N period and outputting said coefficient of variation.

5. The transcoder according to claim 1, wherein said variation coefficient calculation part uses a bit rate of a second stream in the N period as said bit rate of said second stream converted before the N period.

6. The transcoder according to claim 1, wherein said variation coefficient calculation part uses an average bit rate of a second stream in a plurality of past periods including the N period as said bit rate of said second stream converted before the N period.

7. The transcoder according to claim 1, wherein said variation coefficient calculation part adjusts said coefficient of variation by dividing said calculated coefficient of variation by a bit rate of a first stream in the N period.

8. The transcoder according to claim 1, wherein said variation coefficient calculation part adjusts said coefficient of variation by dividing said calculated coefficient of variation by an average bit rate of a first stream in a plurality of past periods including the N period.

9. A transcoder for converting a first stream into a second stream, comprising:
   a part for setting a first target bit rate of a second stream;
   a target bit rate determining part for determining a second target bit rate of said second stream in a (N+1) period on the basis of said first target bit rate of said second stream, a bit rate of said second stream converted before a N period, and a third target bit rate of said second stream in the N period;
   a part for acquiring a bit rate of a first stream before the N period;
   a period conversion factor calculation part for calculating a period conversion factor in the (N+1) period on the basis of a ratio between said determined second target bit rate of said second stream in the (N+1) period and said bit rate of said first stream before the N period; and
   a part for calculating a quantization step value of said second stream of the (N+1) period by multiplying a quantization step value of a first stream in the (N+1) period by said period conversion factor.

10. The transcoder according to claim 9, wherein said period conversion factor calculation part uses a bit rate of a first stream in the N period as said bit rate of said first stream before the N period.

11. The transcoder according to claim 9, wherein said period conversion factor calculation part uses an average bit rate of a first stream in a plurality of past periods including the N period as said bit rate of said first stream before the N period.

12. The transcoder according to claim 9, wherein assuming that a value calculated on the basis of a difference between said third target bit rate of said second stream in the N period and said bit rate of said second stream converted before the N period is determined as a target difference, said target bit rate determining part calculates said second target bit rate of said second stream in the (N+1) period by adding said target difference to said first target bit rate of said second stream.

13. The transcoder according to claim 12, wherein assuming that a ratio between a bit rate of a first stream in the N period and a bit rate of a first stream in the (N−1) period is determined as a period ratio, said target bit rate determining part adjusts said target difference by multiplying said target difference by said period ratio.

14. The transcoder according to claim 12, wherein assuming that a ratio between a bit rate of a first stream in the (N+1) period and a bit rate of a first stream in the N period is determined as a period ratio, said target bit rate determining part adjusts said target difference by multiplying said target difference by said period ratio.

15. The transcoder according to claim 12, wherein assuming that a ratio between an average bit rate of a first stream in a plurality of past periods including the N period and an average bit rate of a first stream in a plurality of past periods including the (N−1) period is determined as a period ratio, said target bit rate determining part adjusts said target difference by multiplying said target difference by said period ratio.

16. The transcoder according to claim 12, wherein assuming that a ratio between an average bit rate of a first stream in a plurality of past periods including the (N+1) period and an average bit rate of a first stream in a plurality of past periods including the N period is determined as a period ratio, said target bit rate determining part adjusts said target difference by multiplying said target difference by said period ratio.

17. The transcoder according to claim 12, wherein
a bit rate of said second stream in the N period is used as said bit rate of said second stream converted before the N period.

18. The transcoder according to claim 12, wherein
an average bit rate of a second stream in a plurality of past periods including the N period is used as said bit rate of said second stream converted before the N period.

19. The transcoder according to claim 12, wherein
assuming that a value calculated on the basis of a difference between a bit rate of a first stream in the N period and a bit rate of a first stream in the (N−1) period is determined as a period difference, said target bit rate determining part adjusts said target difference by multiplying said target difference by said period difference.

20. The transcoder according to claim 12, wherein
assuming that a value calculated on the basis of a difference between a bit rate of a first stream in the N period and a bit rate of a first stream in the (N−1) period is determined as a period difference, said target bit rate determining part adjusts said target difference by adding said period difference to said target difference.

21. The transcoder according to claim 12, wherein assuming that a value calculated on the basis of a difference between a bit rate of a first stream in the (N+1) period and a bit rate of a first stream in the N period is determined as a period difference, said target bit rate determining part adjusts said target difference by multiplying said target difference by said period difference.

22. The transcoder according to claim 12, wherein
assuming that a value calculated on the basis of a difference between a bit rate of a first stream in the (N+1) period and a bit rate of a first stream in the N period is determined as a period difference, said target bit rate determining part adjusts said target difference by adding said period difference to said target difference.

23. The transcoder according to claim 12, wherein
assuming that a value calculated on the basis of a difference between an average bit rate of a first stream in a plurality of past periods including the N period and an average bit rate of a first stream in a plurality of past periods including the (N−1) period is determined as a period difference, said target bit rate determining part adjusts said target difference by multiplying said target difference by said period difference.

24. The transcoder according to claim 12, wherein
assuming that a value calculated on the basis of a difference between an average bit rate of a first stream in a plurality of past periods including the N period and an average bit rate of a first stream in a plurality of past periods including the (N−1) period is determined as a period difference, said target bit rate determining part adjusts said target difference by adding said period difference to said target difference.

25. The transcoder according to claim 12, wherein
assuming that a value calculated on the basis of a difference between an average bit rate of a first stream in a plurality of past periods including the (N+1) period and an average bit rate of a first stream in a plurality of past periods including the N period is determined as a period difference, said target bit rate determining part adjusts said target difference by multiplying said target difference by said period difference.

26. The transcoder according to claim 12, wherein
assuming that a value calculated on the basis of a difference between an average bit rate of a first stream in a plurality of past periods including the (N+1) period and an average bit rate of a first stream in a plurality of past periods including the N period is determined as a period difference, said target bit rate determining part adjusts said target difference by adding said period difference to said target difference.

27. The transcoder according to claim 12, wherein
assuming that a ratio between a bit rate of a first stream in the N period and an average bit rate of a first stream in a plurality of past periods including the N period is determined as a period ratio, said target bit rate determining part adjusts said target difference by multiplying said target difference by said period ratio.

28. The transcoder according to claim 12, wherein
assuming that a ratio between a bit rate of a first stream in the N period and an average bit rate of a first stream in a plurality of past periods including the (N−1) period is determined as a period ratio, said target bit rate determining part adjusts said target difference by multiplying said target difference by said period ratio.

29. The transcoder according to claim 12, wherein
assuming that a ratio between a bit rate of a first stream in the (N+1) period and an average bit rate of a first stream in a plurality of past periods including the (N+1) period is determined as a period ratio, said target bit rate determining part adjusts said target difference by multiplying said target difference by said period ratio.

30. The transcoder according to claim 12, wherein
assuming that a ratio between a bit rate of a first stream in the (N+1) period and an average bit rate of a first stream in a plurality of past periods including the N period is determined as a period ratio, said target bit rate determining part adjusts said target difference by multiplying said target difference by said period ratio.

31. The transcoder according to claim 12, wherein
assuming that a value calculated on the basis of a difference between a bit rate of a first stream in the N period and an average bit rate of a first stream in a plurality of past periods including the N period is determined as a period difference, said target bit rate determining part adjusts said target difference by multiplying said target difference by said period difference.

32. The transcoder according to claim 12, wherein
assuming that a value calculated on the basis of a difference between a bit rate of a first stream in the N period and an average bit rate of a first stream in a plurality of past periods including the N period is determined as a period difference, said target bit rate determining part adjusts said target difference by adding said period difference to said target difference.

33. The transcoder according to claim 12, wherein
assuming that a value calculated on the basis of a difference between a bit rate of a first stream in the N period and an average bit rate of a first stream in a plurality of past periods including the (N−1) period is determined as a period difference, said target bit rate determining part adjusts said target difference by multiplying said target difference by said period difference.

34. The transcoder according to claim 12, wherein
assuming that a value calculated on the basis of a difference between a bit rate of a first stream in the N period and an average bit rate of a first stream in a plurality of past periods including the (N−1) period is determined as a period difference, said target bit rate determining part adjusts said target difference by adding said period difference to said target difference.

35. The transcoder according to claim 12, wherein
assuming that a value calculated on the basis of a difference between a bit rate of a first stream in the (N+1) period and an average bit rate of a first stream in a plurality of past periods including the (N+1) period is determined as a period difference, said target bit rate determining part adjusts said target difference by multiplying said target difference by said period difference.

36. The transcoder according to claim 12, wherein
assuming that a value calculated on the basis of a difference between a bit rate of a first stream in the (N+1) period and an average bit rate of a first stream in a plurality of past periods including the (N+1) period is determined as a period difference, said target bit rate determining part adjusts said target difference by adding said period difference to said target difference.

37. The transcoder according to claim 12, wherein
assuming that a value calculated on the basis of a difference between a bit rate of a first stream in the (N+1) period and an average bit rate of a first stream in a plurality of past periods including the N period is determined as a period difference, said target bit rate determining part adjusts said target difference by multiplying said target difference by said period difference.

38. The transcoder according to claim 12, wherein
assuming that a value calculated on the basis of a difference between a bit rate of a first stream in the (N+1) period and an average bit rate of a first stream in a plurality of past periods including the N period is determined as a period difference, said target bit rate determining part adjusts said target difference by adding said period difference to said target difference.

39. The transcoder according to claim 12, wherein
assuming that an area where said difference between said third target bit rate of said second stream in the N period and said bit rate of said second stream converted before the N period is 0 is determined as a boundary, a rate of change of said calculated target ratio is asymmetrical thereabout.

40. The transcoder according to claim 12, wherein
assuming that a ratio between a bit rate of a first stream in the N period and a bit rate of a first stream in the (N−1) period is determined as a first period ratio and a ratio between a bit rate of a first stream in the (N+1) period and said bit rate of said first stream in the N period is determined as a second period ratio, said target bit rate determining part adjusts said target difference by multiplying said target difference by either one of said first period ratio and said second period ratio.

41. The transcoder according to claim 12, wherein
assuming that a ratio between an average bit rate of a first stream in a plurality of past periods including the N period and an average bit rate of a first stream in a plurality of past periods including the (N−1) period is determined as a first period ratio and a ratio between an average bit rate of a first stream in a plurality of past periods including the (N+1) period and said average bit rate of said first stream in a plurality of past periods including the N period is determined as a second period ratio, said target bit rate determining part adjusts said target difference by multiplying said target difference by either one of said first period ratio and said second period ratio.

42. The transcoder according to claim 12, wherein
assuming that a value calculated on the basis of a difference between a bit rate of a first stream in the N period and a bit rate of a first stream in the (N−1) period is determined as a first period difference and a value calculated on the basis of a difference between a bit rate of a first stream in the (N+1) period and said bit rate of said first stream in the N period is determined as a second period difference, said target bit rate determining part adjusts said target difference by multiplying said target difference by either one of said first period difference and said second period difference.

43. The transcoder according to claim 12, wherein
assuming that a value calculated on the basis of a difference between a bit rate of a first stream in the N period and a bit rate of a first stream in the (N−1) period is determined as a first period difference and a value calculated on the basis of a difference between a bit rate of a first stream in the (N+1) period and said bit rate of said first stream in the N period is determined as a second period difference, said target bit rate determining part adjusts said target difference by adding either one of said first period difference and said second period difference to said target difference.

44. The transcoder according to claim 12, wherein
assuming that a value calculated on the basis of a difference between an average bit rate of a first stream in a plurality of past periods including the N period and an average bit rate of a first stream in a plurality of past periods including the (N−1) period is determined as a first period difference and a value calculated on the basis of a difference between an average bit rate of a first stream in a plurality of past periods including the (N+1) period and said average bit rate of said first stream in a plurality of past periods including the N period is determined as a second period difference, said target bit rate determining part adjusts said target difference by multiplying said target difference by either one of said first period difference and said second period difference.

45. The transcoder according to claim 12, wherein
assuming that a value calculated on the basis of a difference between an average bit rate of a first stream in a plurality of past periods including the N period and an average bit rate of a first stream in a plurality of past periods including the (N−1) period is determined as a first period difference and a value calculated on the basis of a difference between an average bit rate of a first stream in a plurality of past periods including the (N+1) period and said average bit rate of said first stream in a plurality of past periods including the N period is determined as a second period difference, said target bit rate determining part adjusts said target difference by adding either one of said first period difference and said second period difference to said target difference.

46. The transcoder according to claim 12, further comprising
a part for setting an upper limit value or a lower limit value of said second target bit rate of said second stream in the (N+1) period.

47. The transcoder according to claim 12, wherein
said determined second target bit rate in the (N+1) period is adjusted by an external parameter.

48. The transcoder according to claim 9, further comprising
a part for setting an upper limit value or a lower limit value of said second target bit rate of said second stream in the (N+1) period.

49. The transcoder according to claim 1 or 9, further comprising
a part for setting an upper limit value or a lower limit value of said period conversion factor.

50. The transcoder according to claim 1 or 9, wherein
said period conversion factor is recalculated if a bit rate of a first stream varies.

51. The transcoder according to claim 1 or 9, wherein
said target bit rate of said whole second stream is adaptively changed and said period conversion factor is accordingly recalculated.

52. The transcoder according to claim 9, wherein
said determined second target bit rate in the (N+1) period is adjusted by an external parameter.

53. A transcoder for converting a first stream into a second stream, comprising:
a part for setting a first target bit rate of a second stream;
a target bit rate determining part for determining a second target bit rate of said second stream in a (N+1) period on the basis of said first target bit rate of said second stream, a bit rate of said second stream converted before a N period, and a third target bit rate of said second stream in the N period;
wherein assuming that a ratio between said bit rate of said second stream converted before the N period and said third target bit rate of said second stream in the N period is determined as a target ratio, said target bit rate determining part calculates said second target bit rate of said second stream in the (N+1) period on the basis of a ratio between said first target bit rate of said second stream and said target ratio.

54. The transcoder according to claim 53, further comprising
a part for setting an upper limit value or a lower limit value of said second target bit rate of said second stream in the (N+1) period.

55. The transcoder according to claim 53, wherein
said determined second target bit rate in the (N+1) period is adjusted by an external parameter.

56. A transcoder for converting a first stream into a second stream, comprising:
a part for setting a first target bit rate of a second stream;
a target bit rate determining part for determining a second target bit rate of said second stream in a (N+1) period on the basis of said first target bit rate of said second stream, a bit rate of said second stream converted before a N period, and a third target bit rate of said second stream in the N period;
wherein assuming that a value calculated on the basis of a ratio between said bit rate of said second stream converted before the N period and said third target bit rate of said second stream in the N period is determined as a target ratio, said target bit rate determining part calculates said second target bit rate of said second stream in the (N+1) period on the basis of a ratio between said first target bit rate of said second stream and said target ratio.

57. The transcoder according to claim 53 or 56, wherein
assuming that a ratio between a bit rate of a first stream in the (N−1) period and a bit rate of a first stream in the N period is determined as a period ratio, said target bit rate determining part adjusts said target ratio by multiplying said target ratio by said period ratio.

58. The transcoder according to claim 53 or 56, wherein
assuming that a ratio between a bit rate of a first stream in the N period and a bit rate of a first stream in the (N+1) period is determined as a period ratio, said target bit rate determining part adjusts said target ratio by multiplying said target ratio by said period ratio.

59. The transcoder according to claim 53 or 56, wherein
assuming that a ratio between an average bit rate of a first stream in a plurality of past periods including the (N−1) period and an average bit rate of a first stream in a plurality of past periods including the N period is determined as a period ratio, said target bit rate determining part adjusts said target ratio by multiplying said target ratio by said period ratio.

60. The transcoder according to claim 53 or 56, wherein
assuming that a ratio between an average bit rate of a first stream in a plurality of past periods including the N period and an average bit rate of a first stream in a plurality of past periods including the (N+1) period is determined as a period ratio, said target bit rate determining part adjusts said target ratio by multiplying said target ratio by said period ratio.

61. The transcoder according to claim 53 or 56, wherein
a bit rate of said second stream in the N period is used as said bit rate of said second stream converted before the N period.

62. The transcoder according to claim 53 or 56, wherein
an average bit rate of a second stream in a plurality of past periods including the N period is used as said bit rate of said second stream converted before the N period.

63. The transcoder according to claim 56, wherein
assuming that an area where said ratio between said bit rate of said second stream converted before the N period and said target bit rate of said second stream in the N period is 1 is determined as a boundary, a rate of change of said calculated target ratio is asymmetrical thereabout.

64. The transcoder according to claim 63 or 39, wherein
a plurality of patterns are prepared as said rate of change and said rate of change is selected in accordance with the complexity of an image.

65. The transcoder according to claim 53 or 56, wherein
assuming that a ratio between a bit rate of a first stream in the (N−1) period and a bit rate of a first stream in the N period is determined as a first period ratio and a ratio between said bit rate of said first stream in the N period and a bit rate of a first stream in the (N+1) period is determined as a second period ratio, said target bit rate determining part adjusts said target ratio by multiplying said target ratio by either one of said first period ratio and said second period ratio.

66. The transcoder according to claim 53 or 56, wherein
assuming that a ratio between an average bit rate of a first stream in a plurality of past periods including the (N−1) period and an average bit rate of a first stream in a plurality of past periods including the N period is determined as a first period ratio and a ratio between said average bit rate of said first stream in a plurality of past periods including the N period and an average bit rate of a first stream in a plurality of past periods including the (N+1) period is determined as a second period ratio, said target bit rate determining part adjusts said target ratio by multiplying said target ratio by either one of said first period ratio and said second period ratio.

67. The transcoder according to claim 56, further comprising
a part for setting an upper limit value or a lower limit value of said second target bit rate of said second stream in the (N+1) period.

68. The transcoder according to claim 56, wherein
said determined second target bit rate in the (N+1) period is adjusted by an external parameter.

* * * * *